W. J. WILSON & J. F. RUFF.
ENSILAGE PACKER.
APPLICATION FILED SEPT. 15, 1915.

1,194,912.

Patented Aug. 15, 1916.
2 SHEETS—SHEET 2.

WITNESSES

INVENTORS
Walter J. Wilson
John F. Ruff
BY
ATTORNEYS

UNITED STATES PATENT OFFICE.

WALTER J. WILSON AND JOHN F. RUFF, OF PETERSBURG, INDIANA; SAID RUFF ASSIGNOR TO SAID WILSON.

ENSILAGE-PACKER.

1,194,912.  Specification of Letters Patent.  Patented Aug. 15, 1916.

Application filed September 15, 1915. Serial No. 50,739.

*To all whom it may concern:*

Be it known that we, WALTER J. WILSON and JOHN F. RUFF, citizens of the United States, and residents of Petersburg, in the county of Pike and State of Indiana, have invented certain new and useful Improvements in Ensilage-Packers, of which the following is a specification.

Our invention relates to means for packing ensilage in silos, and the main object thereof is to provide new and improved means which are simple in construction and easily manipulated, which enable two men to accomplish the same results now requiring five men, which packs the ensilage uniformly and thus improves the condition thereof and reduces loss through decay and by means of which the capacity of a given silo will be increased.

Our invention is fully described in the following specification, of which the accompanying drawings form a part, in which like characters refer to like parts in each of the views, and in which:—

Figure 1:
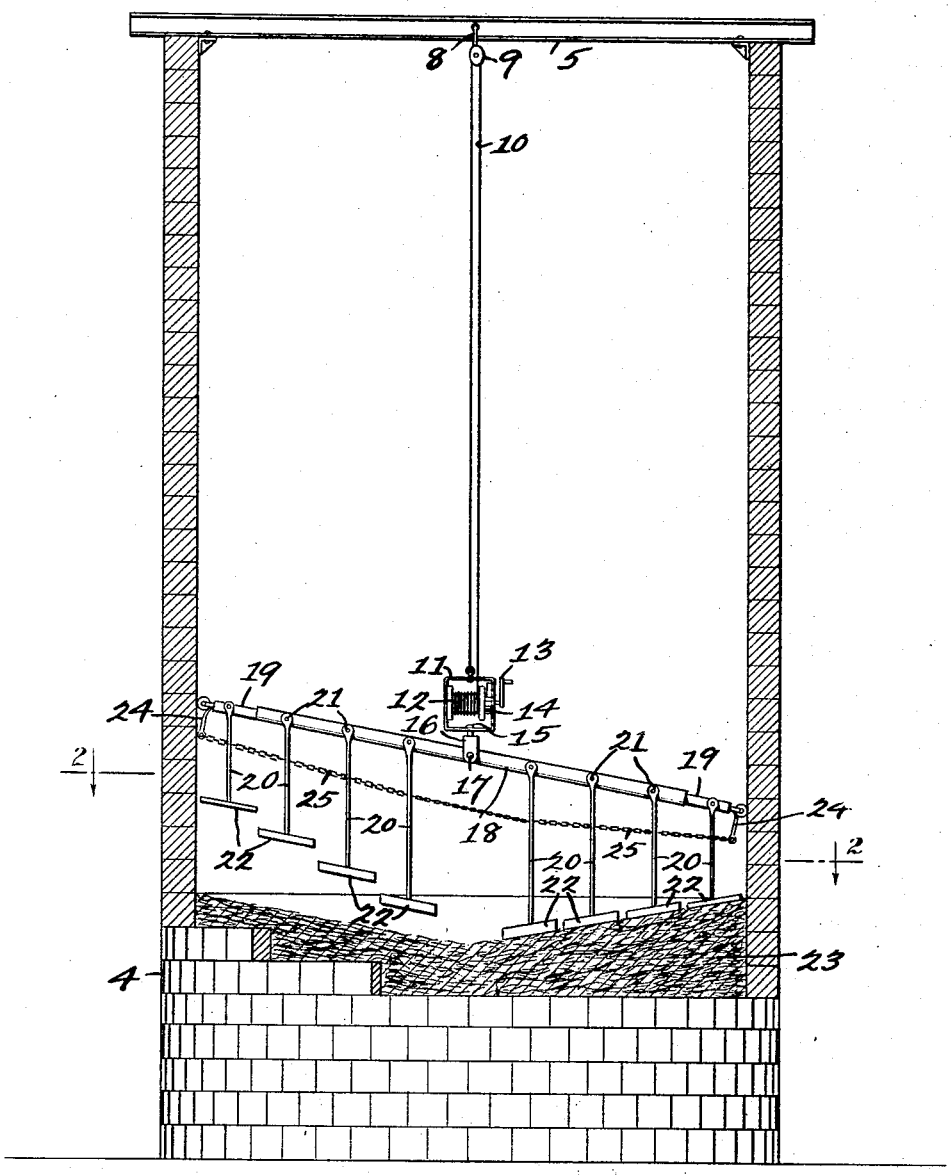
Figure 2:
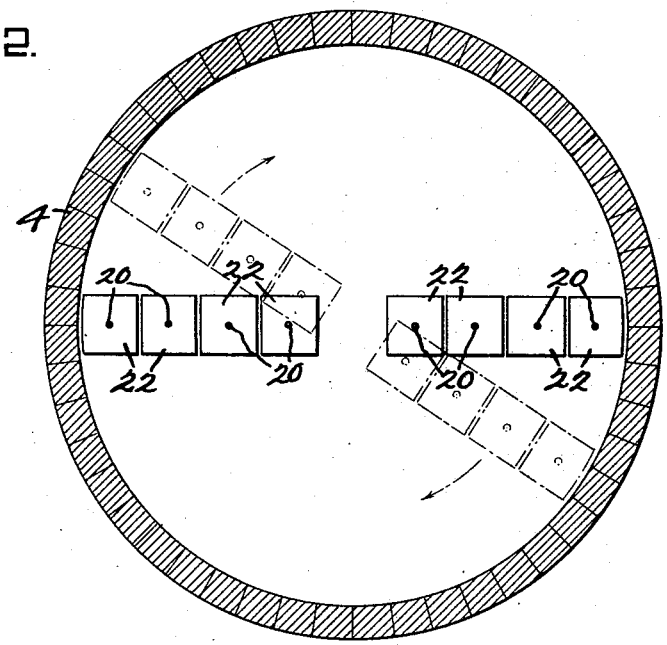

Figure 1 is a side elevation of a silo provided with our invention, said silo being partly in central vertical section. Fig. 2 is a section taken on the line 2—2 of Fig. 1; and Fig. 3 is a view of the portion of our apparatus used when filling a silo entirely to the top.

Figure 3:
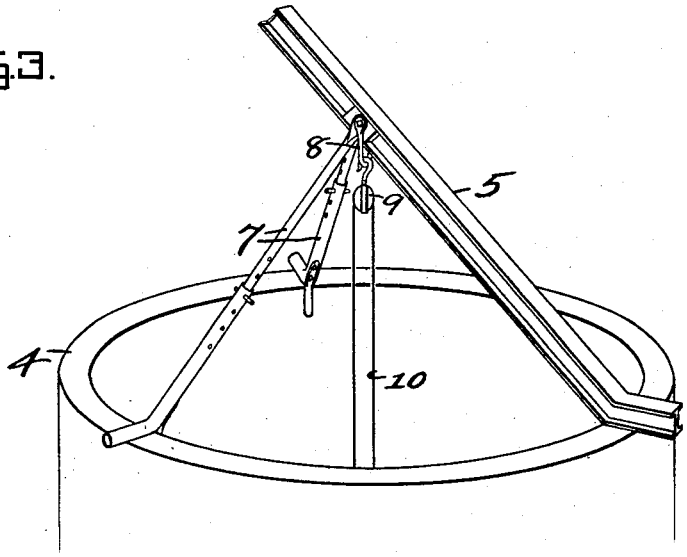

In the drawings forming a part of this application we have shown a silo 4 at the top of which is mounted a beam 5 which may be horizontal as shown in Fig. 1 and rest on the walls of the silo, or which may be inclined by means of brace members 7 as shown in Fig. 3, the arrangement of this feature being subject to modification to meet conditions.

Connected with the beam 5, as by a link 8, is a dependent pulley 9 for a cable 10, said pulley being arranged on the vertical axis of the silo; the cable 10 has one end thereof secured to a frame 11 within which is mounted a drum 12 operable by means of a crank-arm 13 and locked in position by means of a pawl and ratchet arrangement 14, and the other end of the cable 10 is wound upon the drum 12 whereby said frame 11 and connected parts may be raised or lowered at will.

Swiveled in the bottom of the frame 11, at 15, is a yoke 16 carrying a pivot pin 17 for a beam 18 provided with telescoping end extensions 19 to adapt the device to silos of different diameters, the pivot pin 17 being in the exact center of the beam 18 whereby said beam may be readily swung through a vertical plane and, because of the swivel 15, said beam 18 may also be swung in a horizontal plane.

Suspended from the beam 18 and from its extensions 19 are a plurality of spaced rods 20 connected with said beam by means of pivots 21 and the lower ends of which carry weights 22 set at an upward and outward angle with respect to a horizontal plane through said silo and with respect to the vertical axis of said silo, the weights 22 being gradually lightened from the center of the silo outwardly toward the walls of the silo, the reason for which is that the farther a weight is from the fulcrum 17 the greater the leverage of the beam 18 and, consequently, a light weight at the end of one of the arms of the beam 18 exerts the same force of a downward blow thereof as a heavier weight adjacent the fulcrum 17.

The rods 20 are successively shortened in length from the center of the silo outwardly in order to bring all the weights 22 in line with each other when the respective end of the beam 18 is depressed, as clearly shown at the right of Fig. 1, thereby tamping the ensilage 23 downwardly from the walls to the center thereof and, when the beam 18 is gradually moved in a horizontal plane during the tamping, the top of the ensilage presents a dished surface, as is clearly shown. In order to insure the desired relationship between the weights at each end of the beam 18, we provide an arm 24 at each extreme beam end and secure a short length of chain 25 to each arm 24 and to the respective rods 20, this preventing the tendency of the weights, because of their inclined positions and the inclination of the top of the ensilage, from sliding downwardly of the ensilage and toward the center of the silo.

In practice, an operator stands in the center of the silo and draws down first one arm of the beam 18 and then the other in the nature of a walking-beam, the corresponding weights 22 at each side of the operator thus being driven downwardly on the ensilage to pack the same firmly together and, when the other man has delivered enough ensilage to the silo to raise the level thereof when packed to a height preventing effective work of the weights 22, the crank 13 may be operated to rotate the drum 12 to raise the beam 18 and its connected weights to an effective height. In this manner the silo is filled and the ensilage solidly tamped and, if the beam 5 shown in Fig. 1 is being used and the frame 11 has reached its upward limit of movement, the beam 5 shown in Fig. 3 may be substituted, thereby raising the pulley 9 above the top of the silo and permitting of entirely filling the latter.

Our apparatus may be readily connected with and removed from a silo and, because of the telescopic arms 19, may be adjusted to different sizes of silos and, in order to tamp the ensilage adjacent the walls of the silo, we prefer to curve the outer edges of the outer weights 22 to approximately conform to the curvature of the said walls.

Our invention is very simple though highly efficient and accomplishes all that is claimed for it and, while we have shown a present preferred detail structure, we do not desire to limit ourselves thereto, but reserve the right to make any desired or necessary changes which are not a departure from the spirit of the invention and which come within the scope of the following claims.

Having fully described our invention, what we claim as new, and desire to secure by Letters Patent, is:—

1. The combination with a silo, of a support at the top thereof, a centrally pivoted beam carried thereby, dependent weights on each arm of said beam the lower surface of each of which is upwardly and outwardly inclined toward the walls of said silo, and means for adjusting the height of said beam.

2. The combination of a silo, of a support at the top thereof, a pulley dependent therefrom, a cable engaged in said pulley, a drum for receiving one end of said cable, means for rotating said drum, means for locking said drum, a beam carried beneath said drum provided with a central pivot, dependent rods on the arms of said beam, and weights carried by the lower ends of said rods.

3. The combination with a silo, of a support at the top thereof, a pulley carried by said support above the top of said silo, a cable in said pulley, a frame secured to one end of said cable, a drum carried by said frame and upon which the other end of said cable is wound, means for rotating said drum, means for locking said drum, a yoke swiveled beneath said frame, a beam centrally pivoted in said yoke, telescopic extensions at the ends of said beam, a plurality of rods pivoted to each arm of said beam, a weight at the lower end of each rod, and means for maintaining said rods and weights in desired relationship with each other and with the ends of said beam.

In testimony whereof we have signed our names to this specification in the presence of two subscribing witnesses.

WALTER J. WILSON.
JOHN F. RUFF.

Witnesses:
WILLIAM R. SMITH,
D. F. BILLARD.

Copies of this patent may be obtained for five cents each, by addressing the "Commissioner of Patents. Washington, D. C."